(12) United States Patent
Takeda

(10) Patent No.: US 6,229,622 B1
(45) Date of Patent: *May 8, 2001

(54) PRINTER APPARATUS AND METHOD OF CONTROLLING SAME

(75) Inventor: Shoji Takeda, Tokyo (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/808,830

(22) Filed: Feb. 28, 1997

(30) Foreign Application Priority Data

Mar. 5, 1996 (JP) .................................................. 8-047667

(51) Int. Cl.[7] .................................................. G06K 15/00
(52) U.S. Cl. ......................................... 358/1.16; 358/1.13
(58) Field of Search .................................. 395/101, 112, 395/114, 115, 116, 821, 865, 825, 826, 827, 840, 841, 872, 881; 345/508, 507; 358/404, 444, 448, 401–402, 412, 486, 408, 1.1, 1.13, 1.15, 1.16, 1.17; 399/382, 82, 83–87, 374; 710/1, 45, 5, 6, 7, 20, 21, 52, 61

(56) References Cited

U.S. PATENT DOCUMENTS 3,974,363 * 8/1976 Malinich ........................ 275/925 B
4,213,694 * 7/1980 Kuseski ................................. 355/26
5,504,843 * 4/1996 Cutapano et al. .................... 395/115
5,619,649 * 4/1997 Kovnat et al. ....................... 395/114

FOREIGN PATENT DOCUMENTS

| 3-007362 | 1/1991 | (JP) . |
| 3-260827 | 11/1991 | (JP) . |
| 4-128342 | 11/1992 | (JP) . |
| 6-149207 | 5/1994 | (JP) . |
| 6-187334 | 7/1994 | (JP) . |
| 6-324821 | 11/1994 | (JP) . |
| 7-131583 | 5/1995 | (JP) . |
| 7-141134 | 6/1995 | (JP) . |
| 8-034147 | 2/1996 | (JP) . |
| 8-063307 | 3/1996 | (JP) . |
| 9-234932 | 9/1997 | (JP) . |

* cited by examiner

Primary Examiner—Arthur G. Evans
(74) Attorney, Agent, or Firm—Fitzpatrick, Cella, Harper & Scinto (57) ABSTRACT

When a single user prints out a large quantity of printed matter in a situation where the printer is shared by a plurality of users, other users must wait an extended period of time regardless of the quantity of material which they are to print out. Accordingly, the inventive printer stores received print data upon classifying the print data according to independent spool areas that correspond to respective ones of the users. At printout, fixed quantities of data are printed from the respective spool areas in regular order. Even if there is a user printing out a large quantity of printed matter, other users who are to print out small quantities of printed matter need not wait for the end of the large printing job.

133 Claims, 8 Drawing Sheets

PRINTER APPARATUS AND METHOD OF CONTROLLING SAME

BACKGROUND OF THE INVENTION

1. Field of the Invention

This invention relates to a printer apparatus for forming and outputting an image upon accepting a print data file or the like created and edited by, e.g., a host computer. The invention relates further to a method of controlling this apparatus.

2. Description of the Related Art

In a printer apparatus according to the prior art, print data sent to the printer apparatus from a host computer are stored temporarily on a hard disk or the like and the accumulated data are then printed out at a subsequent time.

In a case where, say, a first user executes 10 pages of printing first and then a second user executes a single page of printing, the conventional method of control is such that the printout for the second user is the 11th page. This means that in order to print out one page, the second user must wait for an amount of time needed to print out 11 pages. The more the first user increases the number of pages to be printed, the longer the second user must wait.

Thus, printing is performed in accordance with a simple first-in, first-out scheme. If a printing job including a large quantity of data is being processed by the printer, the processing of printing jobs that are to follow is delayed and the processing efficiency of the overall system may decline.

SUMMARY OF THE INVENTION

An object of the present invention is to provide a printer apparatus, as well as a method of controlling the same, in which a later printing job can be executed before an earlier printing job is finished, thereby making it possible to improve the efficiency of the overall printing system.

Accordingly, the invention provides a printer apparatus for performing printout based upon print data received by the apparatus, comprising memory means for storing the received print data in relation to prescribed attributes in areas corresponding to individual attribute values, output means for printing out print data as an image, and control means for controlling the output means so as to cause print data that have been stored in the memory means to be printed out in a prescribed amount on a per-area basis, and to repeat this operation with regard to each area.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DESCRIPTION OF THE PREFERRED EMBODIMENTS

First Embodiment

A printer apparatus 100 according to a first embodiment of the invention will now be described with reference to FIG. 1

The printer apparatus 100 is connected to a LAN cable 213 or to a host computer 101. Though only one host computer is shown, the printer apparatus can be connected to a plurality of host computers.

The printer apparatus 100 includes a CPU 201, which is a microprocessor that supervises overall control of the image forming apparatus. The CPU 201, which is operated by a real-time operating system, includes a timer 2011. A flowchart described later is implemented by executing a program, which has been stored in a RAM 203, by the CPU 201 under the control of the operating system.

A large-capacity hard disk (HD) 202 stores a plurality of applications run by the CPU 201 and spools print data from the host computer. The HD 202 is under the management of the CPU 201.

The RAM 203 is a working memory used by the CPU 201 for various operations and can be accessed by the CPU 201 at high speed.

A high-speed CPU bus 204, which interconnects the CPU 201, HD 202, RAM 203 and various functional units described later, transfers data processed by the CPU 201 to each functional unit and transfers data between the functional units at high speed (by DMA transfer). Examples of the bus 204 are a VL bus and a PCI bus.

A raster image producer (RIP) 205 is a functional unit that receives an image forming command, which is described in page description language (PDL), entered from an external interface connected to a computer described below, and forms a bitmap image in accordance with the content of the command. The image forming command is entered from the high-speed CPU bus 204, and an image is output to a high-speed image bus 216 described below. Examples of page description language processed by the RIP 205 include Postscript, PCL, LIPS and CaPSL, all of which are trade names.

An image processor 206 is a functional unit which, in accordance with a processing instruction from the CPU 201, applies filtering processing such as smoothing or edge processing to the image that has entered from the high-speed image bus 216. The image processor 206 also has a character recognition function for recognizing characters included in the image that has entered from the high-speed image bus 216, and an image separation function for separating character portions and image portions for the input image.

A compression/decompression unit 207 uses an image compression method in accordance with an MH, MR, MMR or JPEG scheme, etc., to compress the image that has entered from the high-speed image bus 216, transmits the compressed data to the high-speed CPU bus 204 or high-speed image bus 216. Conversely, the compression/decompression unit 207 decompresses compressed data, which have entered from these buses, in accordance with the scheme used by this functional unit for compression, and transmits the decompressed data to the high-speed image bus 216.

A bus bridge 208 is a bus bridge controller for connecting the high-speed CPU bus 204 and a low-speed CPU bus 209, described later, and serves to eliminate the difference between these two processing speeds. Introducing the bus bridge 208 makes it possible for the CPU 201, which operates at high speed, to access low-speed functional units connected to the low-speed CPU bus 209.

The low-speed CPU bus 209, which has a transfer rate lower than that of the high-speed CPU bus 204, is for connecting functional units which execute processing at comparatively low speeds. An example of such a bus is an ISA bus.

A LAN interface 212, which is a functional unit for connecting the printer apparatus to a private network (LAN) 213, sends and receives data to and from the private network 213. An example of such an interface is the Internet.

A panel interface 215 is a functional unit for interfacing various control signals with respect to a control panel 221. More specifically, the panel interface 215 sends the CPU 201 signals from input switches such as keys provided on the control panel 221, and performs a resolution conversion so that image data created by the RIP 205, image processor 206 and compression/decompression unit 207 may be displayed on a liquid crystal display unit provided on the control panel 221.

The high-speed image bus 216 is for interconnecting image input/output buses in the various image generating units (RIP 205, image processor 206 and compression/decompression unit 207) and a scanner interface 217 and printer interface 219, which are described below. This bus, which is not under the supervision of the CPU 201, is controlled by a bus controller (not shown) so as to transfer data.

The scanner unit 218, which is a visible-image reader having an automatic document feeder, has an RGB three-line CCD color sensor or a monochromatic single-line CCD line sensor. Image data that have been read by the scanner unit 218 are transferred to the high-speed image bus 216 by the scanner interface unit 217.

The scanner interface unit 217 binarizes image data, which have been read by the scanner unit 218, by an optimum method depending upon the content of processing executed at subsequent steps. The scanner interface unit 217 also functions to perform a serial-parallel conversion of image data made to conform to the data width of the high-speed image bus 216, and to convert read RGB three-color data to CMYBk data.

The printer unit 220 prints image data, which have been read from the printer interface unit 219, described later, on recording paper as visible image data. Examples of the printer unit 220 that can be mentioned are an ink-jet printer for printing on recording paper by getting ink doplets, and a laser-beam printer utilizing electrophotography to form an image on a photosensitive drum by a laser beam and transferring the image to recording paper. Examples of the laser-beam printer are a monochromatic laser-beam printer and a CMYBk-color laser-beam printer.

The printer interface unit 219 transfers image data, which have been sent from the high-speed image bus 216, to the printer unit. The printer interface unit 219 has a bus-width conversion function for converting the width of data to a bus width made to conform to the gradation of the printer to be outputted from the bus width of the high-speed image bus 216, and a function for eliminating the differences among the printing speed of the printer, the speed of the high-speed image bus 216 and the transfer rate of the image data.

The control panel 221 has a liquid crystal display unit, a touch-sensitive panel affixed to the liquid crystal display unit, and a plurality of physical keys. A signal entered by touching the touch-sensitive panel or by pressing a key is sent to the CPU 201 via the panel interface 215, and the liquid crystal display unit displays image data sent from the panel interface 215. A function display for operating the image forming apparatus and image data are displayed on the liquid crystal display unit.

The operation of the printer apparatus when data are transferred from the computer 101, the operation of the printer apparatus 100 when spool areas are set, and the operation by the printer 100 when transferred data are output will now be described with reference to the flowcharts of FIG. 2 and FIGS. 3A, 3B, respectively. These operations are based upon the configuration of the apparatus set forth above.

Figure 3A:
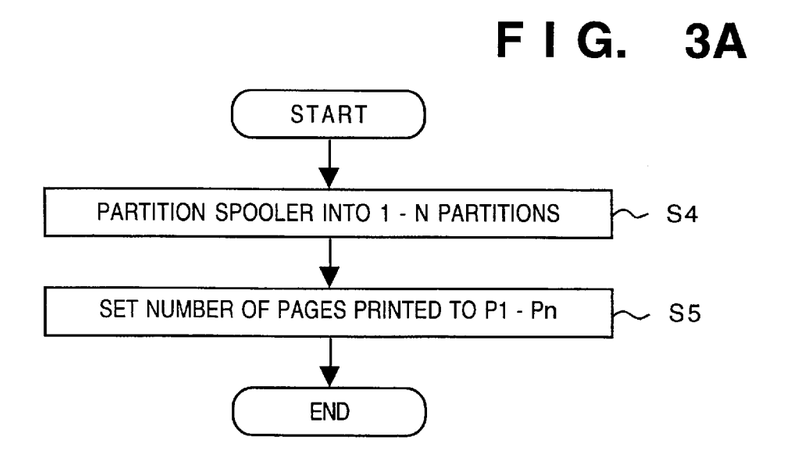
FIGS. 3A and 3B are flowcharts of the first and second embodiments of the invention.

Spooler Allocation (FIG. 3A)

Step S4: A spool area provided in the HD 202 is partitioned into a number of areas decided in advance. The number of partitions is the number of users registered in the printer apparatus or the number of users licensed to use the printer apparatus. In this embodiment, in other words, the number of users is employed as the attribute of the print job and serves as the standard according to which spool files are divided. Each area obtained by partitioning corresponds to a user.

The registration of the number of users in the printer may be performed in accordance with a predetermined procedure using the control panel 221 or by a prescribed instruction from the host computer. In either case, the data for identifying the user is stored beforehand in a prescribed area of the HD 202.

Step S5: The number (Px) of pages printed per one processing operation of a spool area, i.e. of each user, is set. For example, the number of pages set is three or four for users who always have a large number of pages to print and to one for other users. It should be noted that the quantity set may be length of time rather than amount of data. However, since it is necessary to leave off on a per-page basis in the case of a page printer, the moment at which output of a page currently being printed ends is adopted as the place to start upon elapse of a prescribed period of time.

Further, the number of pages per processing operation by each user is set from the control panel 221 or from the host computer in the same manner as the number of users. If performing the setting in this manner is troublesome, a fixed value can be used. In this case, the setting would be $P1=\ldots=Pn=C$ (where C is a constant).

Printing processing starts when the number of pages printed per processing operation of each user has been set following spool area allocation. First, data from the host computer are received through the procedure shown in FIG. 2.

Figure 2:
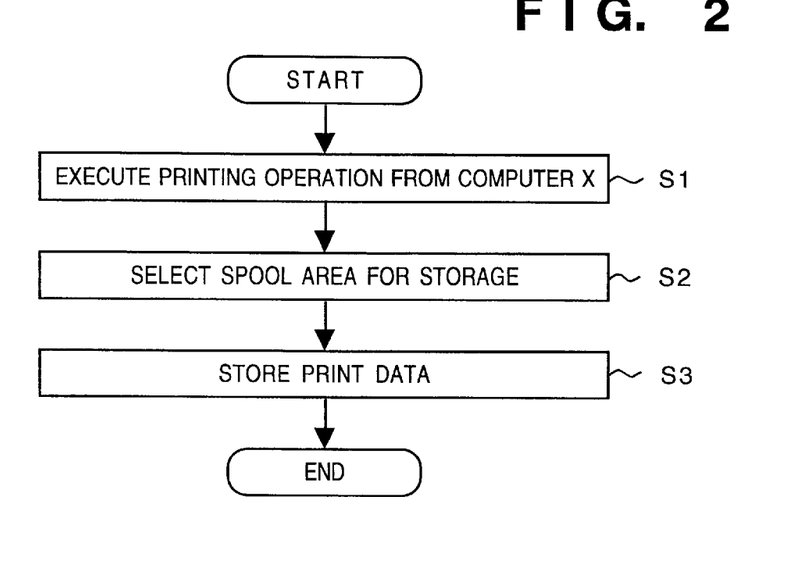
FIG. 2 is a flowchart of first and second embodiments of the invention.

Data Reception (FIG. 2)

Step S1: A document obtained from a specific computer and created and edited by the computer is printed and a print command which includes print data is received.

Step S2: Print data sent from the computer are transferred from the interface 212 or 214 to the spool area in the HD 202 via the low-speed CPU bus 209, bus bridge 208 and high-speed CPU bus 204. At this time the CPU 201 identifies the user that has sent the data and, in dependence upon the user, selects an area (described later) spooled.

Step S3: The print data are stored in the spool area that corresponds to the user.

The print data spooled by the foregoing procedure are outputted by processing of the kind described next.

Figure 3B:
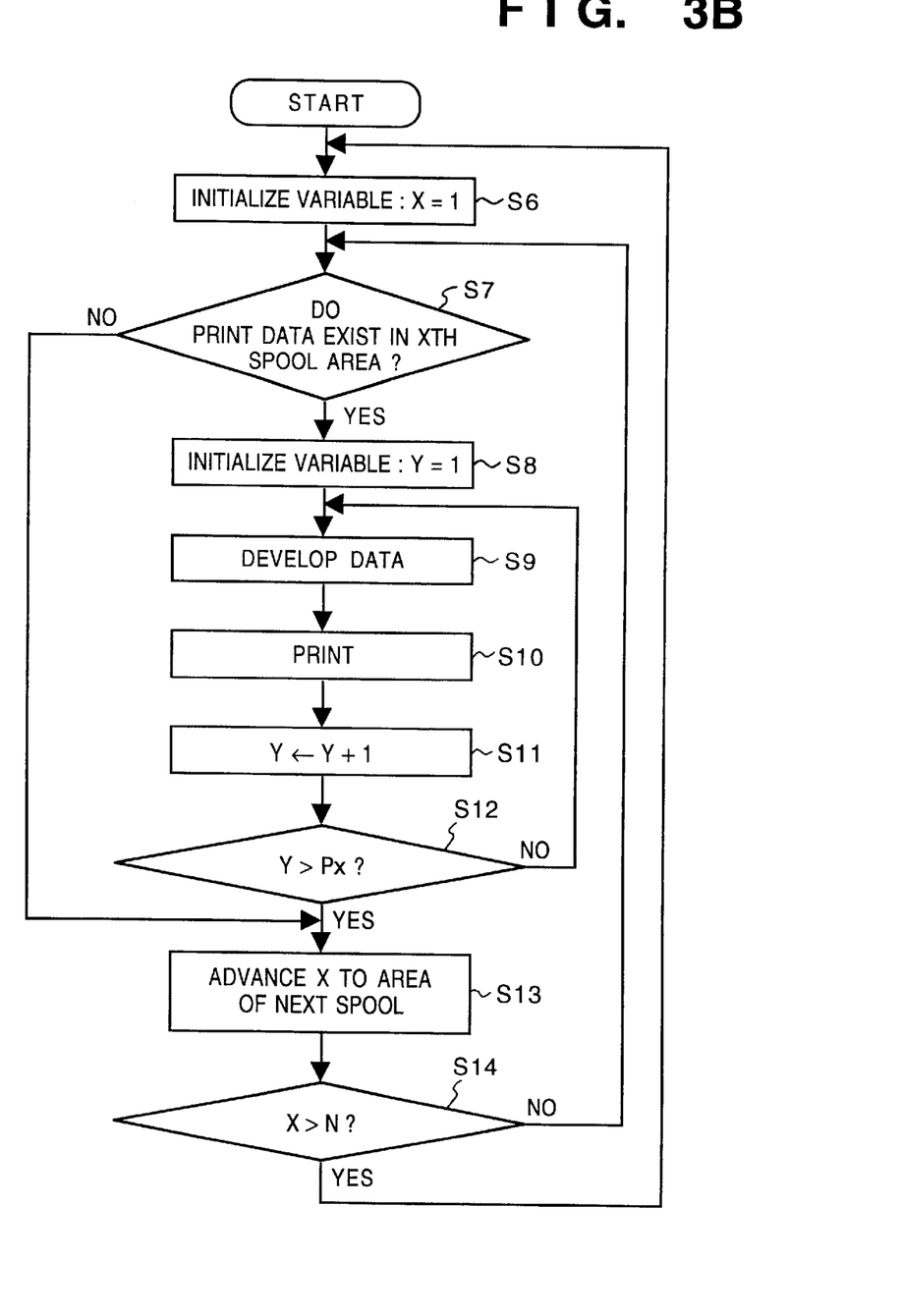

Operation of Printer Apparatus (FIG. 3B)

Step S6: A variable X is initialized through the operation X=1. The variable X is the number of the spool area and indicates the spool area in which data to be printed have been stored. The variable X is incremented starting from 1 and processing is repeated until the number N of partitions of the spool area is attained. Whenever the variable X exceeds N, the program returns to the processing of step S6, where X is made 1.

Step S7: It is verified whether print data have been stored in the Xth spool area. The program proceeds to step S13 if there are no print data. If print data have been stored in the Xth spool area, the processing described below is executed.

Step S8: A variable Y is made 1, where Y is used as a counter of the number of printed pages.

Step S9: One page of print data extracted from the Xth spool area are developed by the RIP 205 into raster image data necessary for image formation. At this time the image processor 206 and compression/decompression unit 207 also execute processing if necessary.

Step S10: One page of raster image data developed at step S9 are sent to the printer unit 220 via the bus 216 and interface 219, and the image is formed on a medium such as recording paper. Billing is calculated based upon number of pages printed, image size and data size, etc.

Step S11: The variable Y indicating the number of pages printed is incremented.

Step S12: It is determined whether the value of the variable Y has exceeded the number (Px) of pages printed per processing operation set at step S5 of FIG. 3A. If the value of variable Y has not exceeded Px, the program returns to step S9 so that the development of the next page of spool data is performed. If Y>Px is found to hold, i.e. if Px has been exceeded, the program proceeds to the processing described below.

Step S13: The variable X indicating the spool area is incremented.

Step S14: If the value of variable X is not greater than the number N of partitions made at step S4, the program returns to step S7, where it is verified whether there are print data in the spool area X. If the relation X>N holds, the program returns to step S6 and the above-described processing is repeated from the first spool area.

By virtue of the processing described above, printout is performed while the spool area is changed over for each of the number of pages decided beforehand for each and every user. Even if there is a user who prints out a large quantity of data, printing can be carried out without the printer being dominated by this user.

Greater convenience is obtained if a plurality of switchable stackers are provided at the exit from which the recording paper is discharged after being printed on. In this case printed matter can be collected on a per-user basis by switching stackers for each spool area at steps S6 and S13.

Second Embodiment

The operation of the printer apparatus according to a second embodiment will be described with reference to FIG. 3A, FIG. 2 and FIG. 3B, as in the first embodiment. Specifically, the operation for spooler allocation, operation when data are received from the host computer and the printing operation by the printer apparatus of the present invention will be described with reference to the flowcharts of FIG. 3A, FIG. 2 and FIG. 3B, respectively. However, it should be noted that there are differences in the details of the steps of FIGS. 2, 3A, 3B. Specifically, whereas spool areas are allocated depending upon the users in the first embodiment, in the second embodiment the spool areas are allocated depending upon the type of PDL.

Spooler Allocation (FIG. 3A)

Step S4: The spool area provided in the HD 202 is partitioned into a number of areas decided in advance. The number of partitions is the number of page description languages capable of being emulated by the printer apparatus. In this embodiment, in other words, the type of PDL is employed as the attribute of the print job and serves as the standard according to which spool files are divided. Each area obtained by partitioning corresponds to a PDL.

It should be noted that since the types of PDLs capable of being emulated by the printer usually are known, it will suffice to partition spool areas in dependence upon the types of PDLs known.

Step S5: The number (Px) of pages printed per processing operation of a spool area, i.e. with respect to each PDL, is set. For example, the number of pages set is three or four for PDLs that the printer can process at high speed and to one for other PDLs. It should be noted that the quantity set may be length of time rather than amount of data. However, since it is necessary to leave off on a per-page basis in the case of a page printer, the moment at which output of a page currently being printed ends is adopted as the place to start upon elapse of a prescribed period of time. Furthermore, the number of pages printed may be decided in dependence upon frequency of use rather than processing speed.

If performing the setting in this manner is troublesome, a fixed value can be used. In this case, the setting would be P1=. . . =Pn=C (where C is a constant).

Printing processing starts when the number of pages printed per processing of each PDL has been set following spool area allocation. First, data from the host computer are received through the procedure shown in FIG. 2.

Data Reception (FIG. 2)

Step S1: A document obtained from a specific computer and created and edited by the computer is printed and a print command which includes print data is received.

Step S2: Print data sent from the computer are transferred from the interface 212 or 214 to the spool area in the HD 202 via the low-speed CPU bus 209, bus bridge 208 and high-speed CPU bus 204. At this time the CPU 201 identifies which PDL is used to describe the print data and selects the area (described later) spooled.

Step S3: The print data are transferred to the spool area that corresponds to the PDL.

The print data spooled by the foregoing procedure are outputted by processing of the kind described next.

Operation of Printer Apparatus (FIG. 3B)

The transferred data are output as follows.

Step S6: The variable X is initialized through the operation X=1. The variable X is the number of the spool area and indicates the spool area in which data to be printed have been stored. The variable X is incremented starting from 1 and processing is repeated until the number N of partitions of the spool area is attained. Processing is the repeated. Whenever the variable X exceeds N, the program returns to the processing of step S6, where X is made 1.

Step S7: It is verified whether print data are have been stored in the Xth spool area. The program proceeds to step S13 if there are no print data. If print data have been stored in the Xth spool area, the processing described below is executed.

Step S8: The variable Y is set to 1, where Y is used as a counter of the number of printed pages.

Step S9: One page of print data is extracted from the Xth spool area and the data area developed by the RIP 205 into raster image data necessary for image formation. At this time the image processor 206 and compression/decompression unit 207 also execute processing if necessary.

Step S10: One page of raster image data developed at step S9 are sent to the printer unit 220 via the bus 216 and interface 219, and the image is formed on a medium such as recording paper.

Step S11: The variable Y indicating the number of pages printed is incremented.

Step S12: If the value of the variable Y has not exceeded the number (Px) of pages printed per processing operation set at step S5, the program returns to step S9 so that the development of the next page of spool data is performed. If Y>Px is found to hold, the program proceeds to the processing described below.

Step S13: The variable X is advanced to a value indicating the next spool area.

Step S14: If the value of variable X is not greater than the number N of partitions made at step S4, the program returns to step S7, where it is verified whether there are print data in the spool area X. If the relation X>N holds, the program returns to step S6 and the above-described processing is repeated from the first spool area.

By virtue of the processing described above, printout is performed, for each of the number of pages decided beforehand, in conformity with the type of PDL. Even if print data described using a PDL that requires a long period of time for development are large in quantity, it is possible to prevent a situation in which the output of other print data is delayed by such data.

Third Embodiment

The operation of the printer apparatus according to a third embodiment will be described with reference to FIGS. 4 and 5. Specifically, an operation for making settings in the printer apparatus using the host computer will be described with reference to FIG. 4, and a printout operation will be described with reference to FIGS. 5A and 5B.

With the printer apparatus of this embodiment, it is possible to select the function--of the printer apparatus, such as the image processing function, whenever data in a spool file are printed. As a result, not only can printout be performed in prescribed amounts for each spool area but it is also possible to apply image processing and editing on a per-spool basis. In addition, the printer apparatus according to this embodiment functions in such a manner that when a prescribed time is attained, the print data that have been spooled are output at such time.

Figure 4:
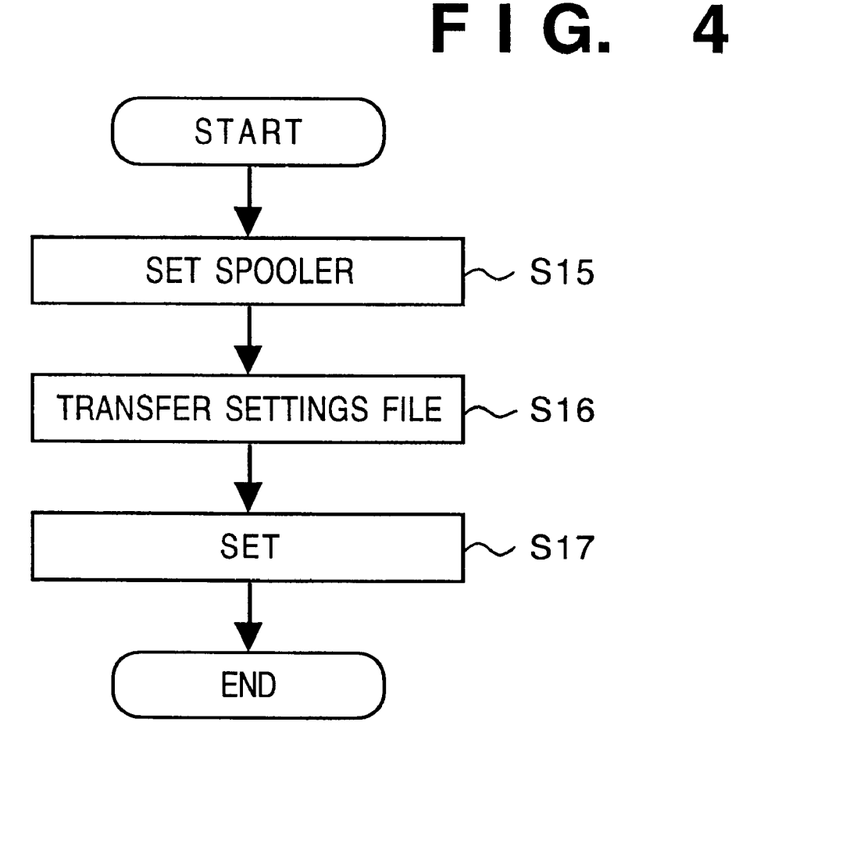
FIG. 4 is a flowchart of a third embodiment of the invention.

Setting Operation by Computer (FIG. 4)

Step S15: Spool areas used in the printer apparatus are set in various ways by the host computer. For example, as described in the first and second embodiments, the host computer makes setting to partition spool areas in dependence upon users and types of PDLs. Settings or modifications cannot be made unless a password is entered.

Step S16: A file in which the settings of a spool area created by the host computer have been stored is transferred from the host computer to the printer apparatus.

Step S17: When a file that has been transferred to the printer apparatus at step S16 is received by the printer apparatus, the latter sets a spool area in accordance with the settings thereof sent from the host computer. This setting is as described above in the first or second embodiment with reference to FIG. 3A.

Thus, settings in the printer apparatus can be made at the host computer.

When the setting of a spool area has been performed, print data are then sent from the host computer to the printer apparatus. The procedure for receiving data in the printer is as described above in conjunction with FIG. 2. Specifically, print data sent from the computer are transferred from the interface 212 or 214 to the spool area in the HD 202 via the low-speed CPU bus 209, bus bridge 208 and high-speed CPU bus 204. At this time the CPU 201 selects, in accordance with the settings made at step S17, the area spooled and stores the print data.

Figure 5A:
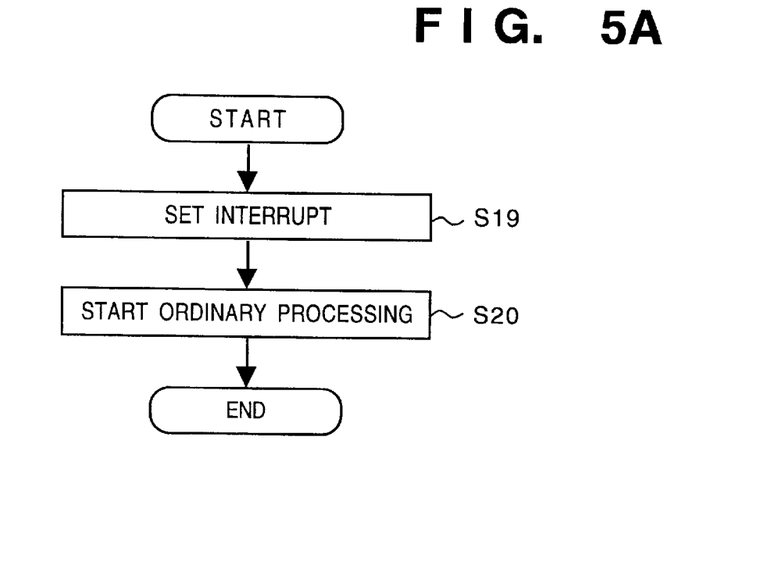
FIGS. 5A and 5B are flowcharts of the third embodiment of the invention.

Setting of Printer Apparatus (FIG. 5A)

The user, on the other hand, uses the control panel to set the printing conditions in the printer. This procedure is as shown in FIG. 5A.

Step S19: The conditions for starting printing are set. Here the time and the quantity of data received can be set as the conditions. In case of a scheduled printing operation, namely an operation in which printing starts at a set time, the time and the spooler number are set. In a situation where received print data are printed when the data attain a fixed quantity or a fixed number of pages, the quantity or the number of pages is set in addition to the spooler number. In case of a scheduled printing operation, the time entered by a user is set in the real-time timer 2011 provided in the CPU 201. Performing editing or image processing or the like entails making a setting to the effect that an interrupt has been applied from the control panel. These setting are carried out using the panel 221 shown in FIG. 6.

Step S20: The processing illustrated in FIG. 3B is executed. It should be noted, however, that the spool area for which printing starting conditions have been set at step S19 is skipped here without a mere incrementing operation being performed at step S13 in FIG. 3B.

Once printing starting conditions have thus been set, ordinary processing starts.

Figure 5B:
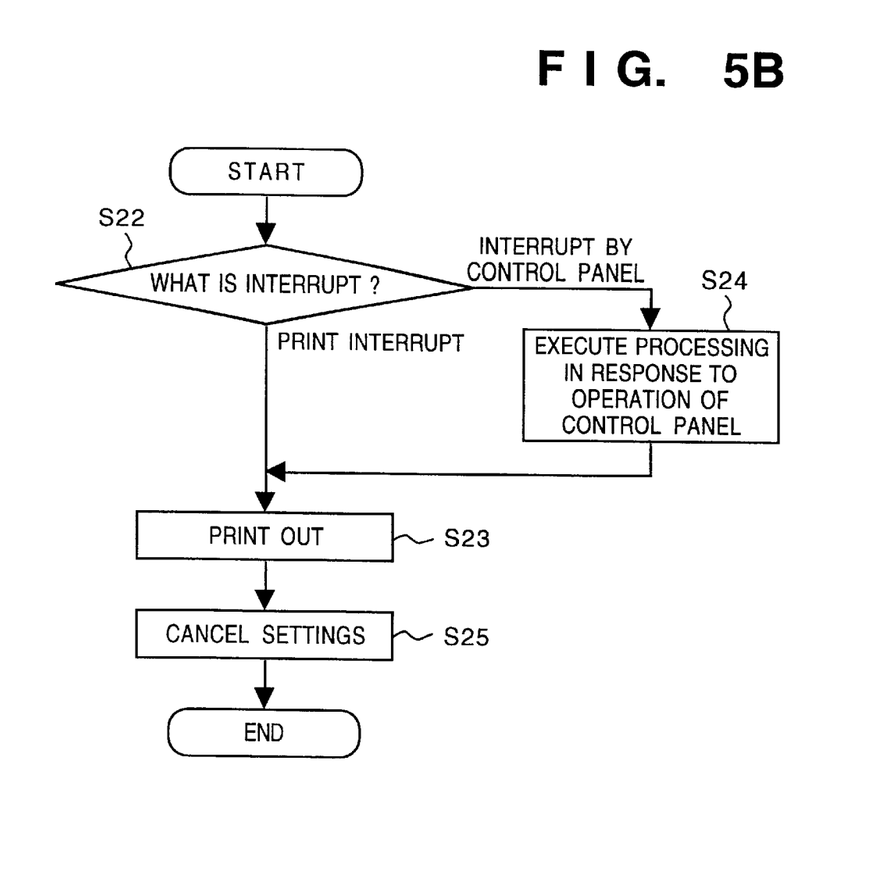

When the conditions set at step S19 have been satisfied, an interrupt is generated and the processing of FIG. 5B is executed. In a case where time has been set as an interrupt condition, the interrupt is generated by the timer 2011. In a case where an amount of data has been set as the interrupt condition, the reception task illustrated in FIG. 2 refers to the value that has been set at step S19. If the conditions are satisfied, an interrupt is generated in the CPU 201.

Since these interrupt conditions are set per spool area, processing is forwarded by step S20 with regard to spool areas for which no conditions have been set.

Step S22: The cause of an interrupt is discriminated. Here, for the sake of simplicity, only an interrupt set at step S19 is considered as the cause of the interrupt. When an interrupt is applied from the control panel, the program proceeds to step S24. In case of an interrupt resulting from the fact that the printing starting conditions have been satisfied, the program returns to step S23.

Step S23: In case of scheduled printing or printing based upon quantity of data or number of pages, the print data in the spool area for which the conditions have been satisfied are printed.

Figure 6:
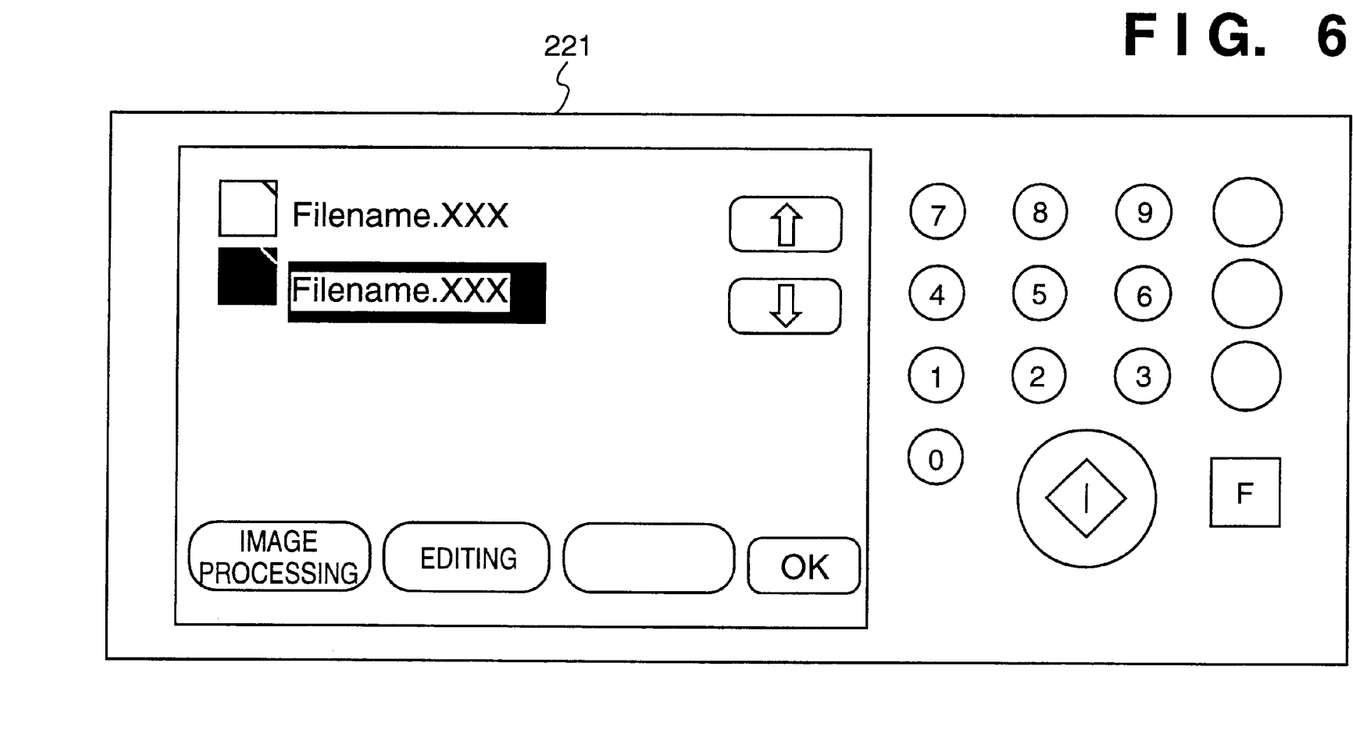
FIG. 6 is a diagram showing a control panel and display unit used in the third embodiment.

Step S24: When the operator presses an "F" key on the control panel 221 of the printer apparatus to enter a password that has been registered in advance, the file in each spool area and functions keys for image processing, editing and previewing are displayed on the display unit 221. An example of such a display is illustrated in FIG. 6. Using the display, the operator selects the particular function and file to execute the desired processing. If the operator presses an "OK" key, the selected file is subjected to the selected processing. Printout is performed at step S23.

Step S25: The settings made at step S19 are restored to the settings that prevailed prior to the interrupt. The reason is to effect a setting with regard to the spool area storing the data printed out at step S23.

In the first and second embodiments, the printer apparatus 100 merely outputs data, successively in predetermined amounts for respective ones of the partitioned spool areas. However, an arrangement can be adopted in which the printer apparatus of this embodiment additionally specifies, with regard to a prescribed spool area, printout of the content of the area at a predetermined time, printout if a predetermined quantity of data has been attained, and printout in dependence a command from the control panel.

Thus, it is possible to select execution of the function of the printer apparatus, such as the image processing function, whenever data in a spool file are printed. As a result, not only can printout be performed in prescribed amounts for respective ones of the spool areas but it is also possible to change the printing settings on a per-spool basis.

Figure 7:
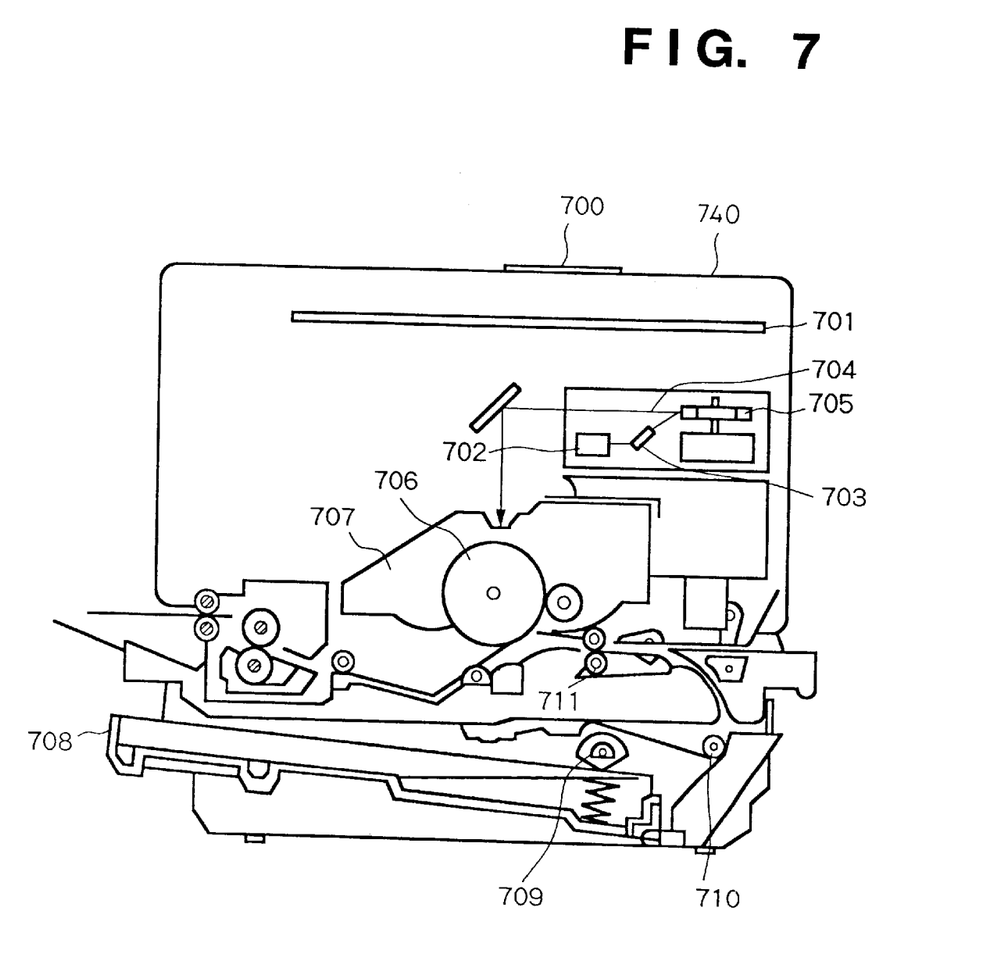
FIG. 7 is a sectional view of a laser-beam printer.

FIG. 7 is a sectional view illustrating the internal structure of a laser-beam printer (referred to as an "LBP" below), which is one example of a printer engine used as the printer unit 220 in the printer apparatus 100. This LBP is capable of printing input character pattern data or the like on recording paper.

As shown in FIG. 7, the LBP has a main unit 740 in which an image is formed on recording paper based upon a supplied character pattern. A control panel 700 includes switches and LED indicators for operating the printer. A printer control unit 701 performs overall control of the LBP 740 and analyzes character pattern information and the like. The printer control unit 701 mainly converts character pattern information to a video signal and outputs the video signal to a laser driver 702.

The laser driver 702 is a circuit for driving a semiconductor laser 703. In conformity with a video signal applied thereto, the laser driver 703 switches on and off a laser beam 704 emitted from the semiconductor laser 703. The laser 704 is deflected horizontally by a rotating polygonal mirror 705 so as to be scanned across an electrostatic drum 706. As a result, an electrostatic latent image of a character pattern is formed on the electrostatic drum 706. The latent image is developed by a development unit 707 surrounding the electrostatic drum 706, after which the image is transferred to the recording paper. Cut sheets of paper are used as the recording paper and are stored in a paper cassette 708 loaded in the LBP 740. The cut sheets are introduced into the apparatus and supplied to the electrostatic drum 706 by a feed roller 709 and conveyance rollers 710, 711.

A laser-beam printer will be described as an example of an image forming apparatus according to this embodiment. It should be noted, however, that the invention is not limited to such a printer and is applicable also to an inkjet printer, described below.

Figure 8:
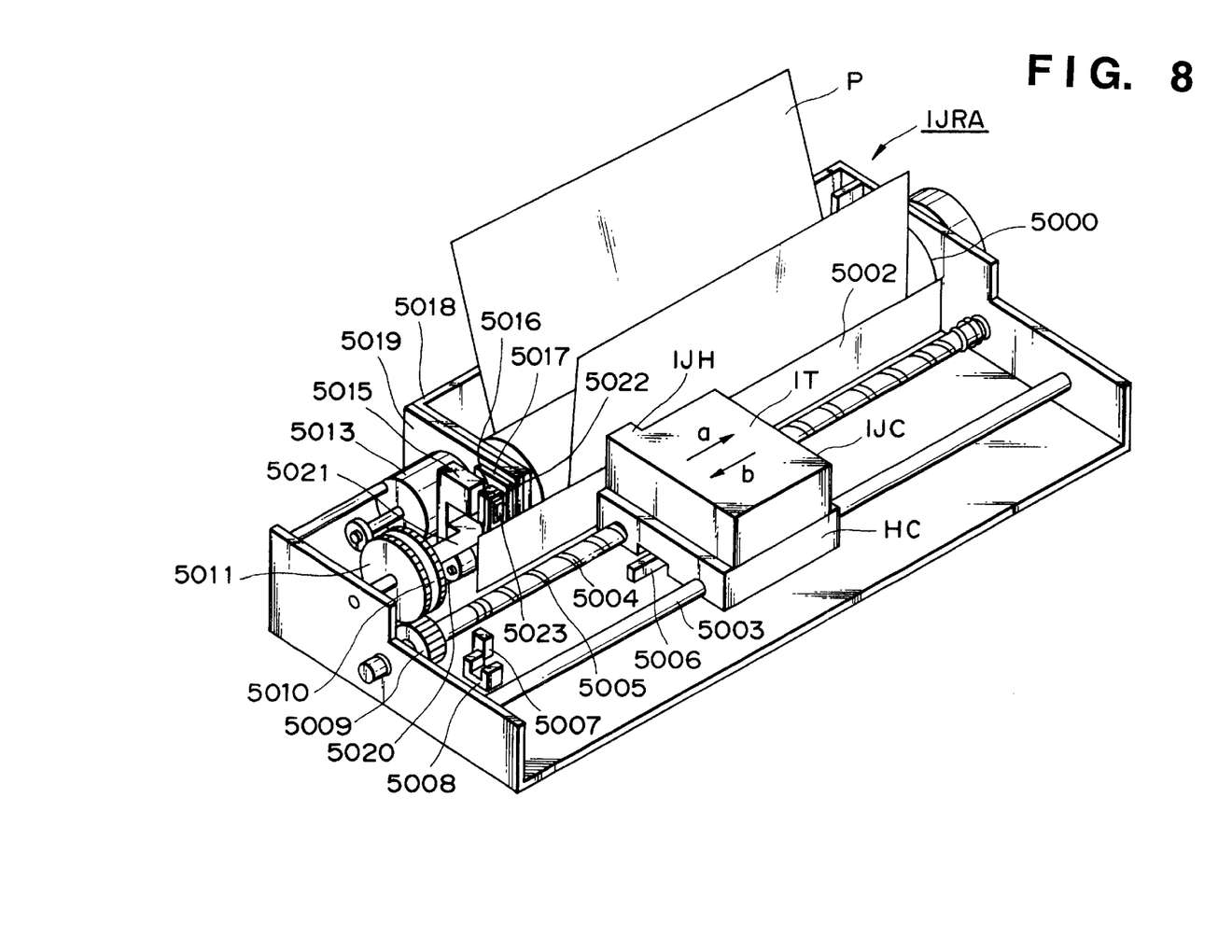
FIG. 8 is a sectional view of an inkjet printer.

FIG. 8 is a perspective view showing an inkjet recording apparatus IJRA applicable as the inkjet printer 220. As shown in FIG. 8, a carriage HC is engaged with a helical groove 5004 of a lead screw 5005 rotated via driving force transmission gears 5011, 5009 in operative association with the forward and reverse rotation of a driver motor 5013. The carriage HC has a pin (not shown) moved back and forth in directions of arrows a and b. An inkjet cartridge IJC is mounted on the carriage HC. A paper retaining plate 5002 presses recording paper P against a platen 5000 along the traveling direction of the carriage. Photocouplers 5007, 5008 constitute home position sensing means for verifying the presence of a carriage lever 5006 in the vicinity of the photocouplers and changing over the direction in which the motor 5013 is rotated. A member 5016 supports a cap member 5022, which is for capping the front side of the recording head. Suction means 5015 for applying suction to the cap subjects the cap to suction recovery via an opening 5023 inside the cap. A member 5019 makes it possible to move a cleaning blade 5017 back and forth. The cleaning blade 5017 and the member 5019 are supported on a support plate 5018. It goes without saying that the blade need not be of this type and that a well-known cleaning blade can be applied to this embodiment. A lever 5021, which is for starting the suction of the suction recovery operation, moves with movement of a cam 5020 engaged with the carriage. Movement is controlled by well-known transmission means whereby the driving force from the driver motor is changed over as by a clutch.

These capping, cleaning and suction recovery operations are carried out at the corresponding positions by the action of the lead screw 5005 when the carriage has arrived in an area on the side of the home position. However, it is so arranged that desired ones of these operations are carried out timings that are well known, such an arrangement will also be applicable to this embodiment.

The present invention can be applied to a system constituted by a plurality of devices (e.g., a host computer, interface, reader, printer, etc.) or to an apparatus comprising a single device (e.g., a copier or facsimile machine, etc.).

Further, the object of the present invention can also be achieved by providing a storage medium storing the program codes of the procedures shown in FIGS. 3A, 3B or FIGS. 5A, 5B for performing the aforesaid functions of the foregoing embodiments to a system or an apparatus, reading the program codes with a computer (e.g., a CPU or MPU) of the system or apparatus from the storage medium, and then executing the program.

In this case, the program codes read from the storage medium implement the novel functions of the invention, and the storage medium storing the program codes constitutes the invention.

Further, the storage medium, such as a floppy disk, hard disk, optical disk, magneto-optical disk, CD-ROM, CD-R, magnetic tape, non-volatile type memory card or ROM can be used to provide the program codes.

Furthermore, besides the case where the aforesaid functions according to the embodiments are implemented by executing the program codes read by a computer, the present invention covers a case where an operating system (OS) or the like working on the computer performs a part of or the entire process in accordance with the designation of program codes and implements the functions according to the embodiment.

Furthermore, the present invention further covers a case where, after the program codes read from the storage medium are written to a function extension board inserted into the computer or to a memory provided in a function extension unit connected to the computer, a CPU or the like contained in the function extension board or function extension unit performs a part of or the entire process in accordance with the designation of program codes and implements the function of the above embodiments.

Thus, as described above, the printer apparatus and method of controlling same according to the present invention are such that during the execution of a printing job that involves the printing of a large quantity of data, another printing job can be executed without waiting for the first job to finish. This makes it possible to raise the overall efficiency of a system that includes a printer.

As many apparently widely different embodiments of the present invention can be made without departing from the spirit and scope thereof, it is to be understood that the invention is not limited to the specific embodiments thereof except as defined in the appended claims.

What is claimed is:

1. A printer apparatus for performing printout based upon print data received by the apparatus, comprising:

memory means for storing the received print data in relation to prescribed attributes in areas corresponding to individual attribute values;

output means for printing out print data as an image; and control means for controlling said output means so as to cause print data that have been stored in said memory means to be printed out in a prescribed amount on a per-area basis, and to repeat this operation with regard to each area.

2. The apparatus according to claim 1, wherein an attribute is a user and said memory means stores received print data in an area corresponding to each user.

3. The apparatus according to claim 1, wherein an attribute is the type of page description language and said memory means stores received print data in an area corresponding to each type of page description language.

4. The apparatus according to claim 1, wherein said control means uses a preset number of pages of print data as the prescribed amount.

5. The apparatus according to claim 1, wherein said control means uses a preset printing time as the prescribed amount.

6. The apparatus according to claim 1, further comprising means for starting printout of the print data by said output means in a case where the print data in each area stored in said memory means has attained a predetermined quantity.

7. The apparatus according to claim 1, further comprising means for starting printout of the print data of each area stored in said memory means in a case where a predetermined time has arrived.

8. The apparatus according to claim 1, further comprising:
a control panel for performing operations manually; and
means for starting printout of the print data of each area stored in said memory means in accordance with an operation performed using said control panel.

9. The apparatus according to claim 8, further comprising means for applying image processing to the print data of each area stored in said memory means.

10. A printer control method for performing printout by output means based upon received print data, comprising:

a storing step of storing the received print data in relation to prescribed attributes in areas corresponding to individual attribute values; and a control step of controlling said output means so as to cause print data that have been stored at said storage step to be printed out in a prescribed amount on a per-area basis, and to repeat this operation with regard to each area.

11. The method according to claim 10, wherein an attribute is a user and said storage step stores received print data in an area corresponding to each user.

12. The method according to claim 10, wherein an attribute is the type of page description language and said storage step stores received print data in an area corresponding to each type of page description language.

13. The method according to claim 10, wherein said control step uses a preset number of pages of print data as the prescribed amount.

14. The method according to claim 10, wherein said control step uses a preset printing time as the prescribed amount.

15. The method according to claim 10, further comprising a step of starting printout of the print data by said output means in a case where the print data in each area stored at said storage step has attained a predetermined quantity.

16. The method according to claim 10, further comprising a step of starting printout of the print data of each area stored at said memory step in a case where a predetermined time has arrived.

17. The method according to claim 10, further comprising a step of starting printout of the print data of each area stored at said storage step in accordance with an operation performed using a control panel for performing operations manually.

18. The method according to claim 17, further comprising a step of applying image processing to the print data of each area stored.

19. A computer readable memory storing a printer control program for performing printout by output means based upon received print data, said memory comprising:

storage code means for storing the received print data in relation to prescribed attributes in areas corresponding to individual attribute values; and control code means for controlling said output means so as to cause the stored print data to be printed out in a prescribed amount on a per-area basis, and to repeat this operation with regard to each area.

20. The memory according to claim 19, wherein an attribute is a user and said storage code means stores received print data in an area corresponding to each user.

21. The memory according to claim 19, wherein an attribute is the type of page description language and said storage code means stores received print data in an area corresponding to each type of page description language.

22. The memory according to claim 19, wherein said control code means uses a preset number of pages of print data as the prescribed amount.

23. The memory according to claim 19, wherein said control code means uses a preset printing time as the prescribed amount.

24. The memory according to claim 19, further comprising code means for starting printout of the print data by said output code means in a case where the print data in each area stored in said storage code means has attained a predetermined quantity.

25. The memory according to claim 19, further comprising code means for starting printout of the print data of each area stored in said storage code means in a case where a predetermined time has arrived.

26. The memory according to claim 19, further comprising code means for starting printout of the print data of each area stored in accordance with an operation performed using a control panel for performing operations manually.

27. The memory according to claim 26, further comprising code means for applying image processing to the print data of each area stored.

28. A printer apparatus for performing printing based upon print data, comprising:

memory means for storing the print data in correspondence with attribute values; and print means for printing an image based upon the print data, stored by said memory means, in a prescribed amount for each attribute value, in a case that the print data corresponding to each attribute value is stored in said memory means.

29. An apparatus according to claim 28, further comprising calculation means for calculating a bill based upon a number of pages printed by said print means.

30. An apparatus according to claim 28, further comprising calculation means for calculating a bill based upon a size of an image printed by said print means.

31. An apparatus according to claim 28, further comprising calculation means for calculating a bill based upon a volume of the print data printed by said print means.

32. An apparatus according to claim 28, further comprising a stacker, having a plurality of stacks switched in accordance with the attribute for stacking a print matter printed by said print means.

33. An apparatus according to claim 28, wherein the prescribed amount is variable.

34. An apparatus according to claim 28, wherein said print means prints an image in the prescribed amount at one time.

35. An apparatus according to claim 28, wherein said print means prints an image in the prescribed amount at one time and repeats the printing with regard to each attribute value.

36. An apparatus according to claim 28, wherein each attribute value corresponds to each user of said printer apparatus.

37. A printer control method for performing printing based upon print data, comprising the steps of:

storing the print data in correspondence with attribute values; and printing an image based upon the print data, stored in said storing step, in a prescribed amount for each attribute value, in a case that the print data corresponding to each attribute value is stored in said storing step.

38. A method according to claim 37, further comprising a step of calculating a bill based upon a number of pages printed in said printing step.

39. A method according to claim 37, further comprising a step of calculating a bill based upon a size of an image printed in said printing step.

40. A method according to claim 37, further comprising a step of calculating a bill based upon a volume of the print data printed in said printing step.

41. A method according to claim 37, further comprising a step of switching stacks of a stacker for stacking a print matter printed in said printing step in accordance with the attribute value.

42. A method according to claim 37, wherein the prescribed amount is variable.

43. A method according to claim 37, wherein an image is printed in the prescribed amount at one time.

44. A method according to claim 37, wherein an image is printed in the prescribed amount at one time and this operation is repeated with regard to each attribute value.

45. A method according to claim 37, wherein each attribute value corresponds to each user of a printer apparatus.

46. A computer readable storage medium storing a program for performing printing based upon print data, said program comprising the steps of:

storing the print data in correspondence with attribute values; and printing an image based upon the print data, stored in said storing step, in a prescribed amount for each attribute value, in a case that the print data corresponding to each attribute value is stored in said storing step.

47. A storage medium according to claim 46, wherein said program further comprises a step of calculating a bill based upon a number of pages printed in said printing step.

48. A storage medium according to claim 46, wherein said program further comprises a step of calculating a bill based upon a size of an image printed in said printing step.

49. A storage medium according to claim 46, wherein said program further comprises a step of calculating a bill based upon a volume of the print data printed in said printing step.

50. A storage medium according to claim 46, wherein said program further comprises a step of switching stacks of a stacker for stacking a print matter printed in said printing step in accordance with the attribute value.

51. A storage medium according to claim 46, wherein the prescribed amount is variable.

52. A storage medium according to claim 46, wherein an image is printed in the prescribed amount at one time.

53. A storage medium according to claim 46, wherein an image is printed in the prescribed amount at one time and this operation is repeated with regard to each attribute value.

54. A storage medium according to claim 46, wherein each attribute value corresponds to each user of a printer apparatus.

55. The apparatus according to claim 1, wherein said memory means includes a plurality of areas each of which corresponds to each value of the attribute.

56. The apparatus according to claim 55, wherein printing is performed for a prescribed amount based upon the data stored in an area of interest, and following printing is performed based upon print data in a next area of interest.

57. The printer apparatus according to claim 28, wherein printing is performed for a prescribed amount based upon the data corresponding to a value of interest, and following printing is performed based upon print data corresponding to a next value of interest.

58. A computer program loadable into a memory of a computer for performing printout by output means based upon received print data, said computer program comprising:

storage code for storing the received print data in relation to prescribed attributes in areas corresponding to individual attribute values; and control code for controlling the output means so as to cause the stored print data to be printed out in a prescribed amount on a per-area basis, and to repeat this operation with regard to each area.

59. A computer program according to claim 58, wherein an attribute is a user and said storage code stores received print data in an area corresponding to each user.

60. A computer program according to claim 58, wherein an attribute is the type of page description language and said storage code stores received print data in an area corresponding to each type of page description language.

61. A computer program according to claim 58, wherein said control code uses a preset number of pages of print data as the prescribed amount.

62. A computer program according to claim 58, wherein said control code uses a preset printing time as the prescribed amount.

63. A computer program according to claim 58, further comprising code for starting printout of the print data by said output means in a case where the print data in each area stored in said storage code has attained a predetermined quantity.

64. A computer program according to claim 58, further comprising code for starting printout of the print data of each area stored in said storage code in a case where a predetermined time has arrived.

65. A computer program according to claim 58, further comprising code for starting printout of the print data of each area stored in accordance with an operation performed using a control panel for performing operations manually.

66. A computer program according to claim 65, further comprising code for applying image processing to the print data of each area stored.

67. A printing system comprising a host computer and a printing apparatus connected to said host computer, wherein
said host computer includes transmission means for transmitting print data to said printing apparatus, and
said printing apparatus includes
memory means for storing the print data received from said host computer in relation to prescribed attributes in areas corresponding to individual attribute values;
output means for printing out print data as an image; and
control means for controlling said output means so as to cause print data that have been stored in said memory means to be printed out in a prescribed amount on a per-area basis, and to repeat this operation with regard to each area.

68. The system according to claim 67, wherein an attribute is a user information and said memory means stores received print data in an area corresponding to each user.

69. The system according to claim 67, wherein an attribute is the type of page description language and said memory means stores received print data in an area corresponding to each type of page description language.

70. The system according to claim 67, wherein said control means uses a preset number of pages of print data as the prescribed amount.

71. The system according to claim 67, wherein said control means uses a preset printing time as the prescribed amount.

72. The system according to claim 67, wherein said printing apparatus further comprises means for starting printout of the print data by said output means in a case where the print data in each area stored in said memory means has attained a predetermined quantity.

73. The system according to claim 67, wherein said printing apparatus further comprises means for starting printout of the print data of each area stored in said memory means in a case where a predetermined time has arrived.

74. The system according to claim 67, wherein said printing apparatus further comprises:
a control panel for performing operations manually; and
means for starting printout of the print data of each area stored in said memory means in accordance with an operation performed using said control panel.

75. The system according to claim 74, wherein said printing apparatus further comprises means for applying image processing to the print data of each area stored in said memory means.

76. The system according to claim 67, wherein said memory means includes a plurality of areas each of which corresponds to each value of the attribute.

77. The system according to claim 76, wherein printing is performed for a prescribed amount based upon the data stored in an area of interest, and subsequent printing is performed based upon print data in a next area of interest.

78. A method for controlling a printing system comprising a host computer and a printing apparatus having output means, the printing apparatus connected to the host computer, said method comprising the steps of:
transmitting print data to the printing apparatus from the host computer;
storing the print data received from the host computer, at the printing apparatus, in relation to prescribed attributes in areas corresponding to individual attribute values;
controlling the output means so as to cause print data that have been stored in said storing step to be printed out in a prescribed amount on a per-area basis, and to repeat this operation with regard to each area.

79. The method according to claim 78, wherein an attribute is user information and the received print data is stored in an area corresponding to each user.

80. The method according to claim 78, wherein an attribute is the type of page description language and the received print data is stored in an area corresponding to each type of page description language.

81. The method according to claim 78, wherein a preset number of pages of print data is used as the prescribed amount in said controlling step.

82. The method according to claim 78, wherein a preset printing time is used as the prescribed amount in said controlling step.

83. The method according to claim 78, further comprising a step of starting printout of the print data by the output means in a case where the print data in each area stored in said storing step has attained a predetermined quantity.

84. The method according to claim 78, further comprising a step of starting printout of the print data of each area stored in said storing step in a case where a predetermined time has arrived.

85. The method according to claim 78, further comprising a step of starting printout of the print data of each area stored in said storing step in accordance with an operation performed using a control panel.

86. The method according to claim 85, further comprising a step of applying image processing to the print data of each area stored in said storing step.

87. The method according to claim 78, wherein the received print data is stored in a plurality of areas each of which corresponds to each value of the attribute in said storing step.

88. The method according to claim 87, wherein the printing is performed for a prescribed amount based upon the data stored in an area of interest, and following printing is performed based upon print data in a next area of interest.

89. The apparatus according to claim 1, wherein said output means prints out an image by utilizing an electrophotography method.

90. The apparatus according to claim 1, wherein said output means prints out an image by utilizing an inkjet method.

91. The apparatus according to claim 1, further comprising connection means for connecting said apparatus with a communication network.

92. The apparatus according to claim 1, wherein the prescribed amount can be changed in accordance with the attribute value.

93. The method according to claim 10, wherein the output means prints out an image by utilizing an electrophotography method.

94. The method according to claim 10, wherein the output means prints out an image utilizing an inkjet method.

95. The method according to claim 10, wherein print data received from a communication network is stored in said storing step.

96. The method according to claim 10, wherein the prescribed amount can be changed in accordance with the attribute value.

97. The memory according to claim 19, wherein the output means prints out an image by utilizing an electrophotography method.

98. The memory according to claim 19, wherein the output means prints out an image by utilizing an inkjet method.

99. The memory according to claim 19, wherein print data received form a communication network is stored by said storage code means.

100. The memory according to claim 19, wherein the prescribed amount can be changed in accordance with the attribute value.

101. The apparatus according to claim 28, wherein said print means prints an image by utilizing an electrophotography method.

102. The apparatus according to claim 28, wherein said print means prints an image by utilizing an inkjet method.

103. The apparatus according to claim 28, further comprising connection means for connecting said apparatus with a communication network.

104. The apparatus according to claim 28, wherein the prescribed amount can be changed in accordance with the attribute value.

105. The method according to claim 37, wherein an image is printed in said printing step by utilizing an electrophotography method.

106. The method according to claim 37, wherein an image is printed in said printing step by utilizing an inkjet method.

107. The method according to claim 37, wherein print data received from a communication network is stored in said storing step.

108. The method according to claim 37, wherein the prescribed amount can be changed in accordance with the attribute value.

109. The storage medium according to claim 46, wherein an image is printed in said printing step by utilizing an electrophotography method.

110. The storage medium according to claim 46, wherein an image is printed in said printing step by utilizing an inkjet method.

111. The storage medium according to claim 46, wherein print data received from a communication network is stored in said storing step.

112. The storage medium according to claim 46, wherein the prescribed amount can be changed in accordance with the attribute value.

113. The computer program according to claim 58, wherein the output means prints out an image by utilizing an electrophotography method.

114. The computer program according to claim 58, wherein the output means prints out an image by utilizing an inkjet method.

115. The computer program according to claim 58, wherein print data received from a communication network is stored by said storage code.

116. The computer program according to claim 58, wherein the prescribed amount can be changed in accordance with the attribute value.

117. The system according to claim 67, wherein said output means prints out an image by utilizing an electrophotography method.

118. The system according to claim 67, wherein said output means prints out an image by utilizing an inkjet method.

119. The system according to claim 67, wherein said host computer and said printing apparatus are connected with each other by a communication network.

120. The system according to claim 67, wherein the prescribed amount can be varied in accordance with the attribute value.

121. The method according to claim 78, wherein the output means prints out an image by utilizing an electrophotography method.

122. The method according to claim 78, wherein the output means prints out an image by utilizing an inkjet method.

123. The method according to claim 78, wherein the host computer and the printing apparatus are connected with each other by a communication network.

124. The method according to claim 78, wherein the prescribed amount can be changed in accordance with the attribute value.

125. The apparatus according to claim 29, wherein the bill includes a maintenance fee.

126. The apparatus according to claim 30, wherein the bill includes a maintenance fee.

127. The apparatus according to claim 31, wherein the bill includes a maintenance fee.

128. The method according to claim 38, wherein the bill includes a maintenance fee.

129. The method according to claim 39, wherein the bill includes a maintenance fee.

130. The method according to claim 40, wherein the bill includes a maintenance fee.

131. The storage medium according to claim 47, wherein the bill includes a maintenance fee.

132. The storage medium according to claim 48, wherein the bill includes a maintenance fee.

133. The storage medium according to claim 49, wherein the bill includes a maintenance fee.

* * * * *

UNITED STATES PATENT AND TRADEMARK OFFICE
CERTIFICATE OF CORRECTION

PATENT NO.     : 6,229,622 B1
DATED          : May 8, 2001
INVENTOR(S)    : Shoji Takeda Page 1 of 1

It is certified that error appears in the above-identified patent and that said Letters Patent is hereby corrected as shown below:

<u>Title page,</u>
Item [57] ABSTRACT,
Line 9, "in" should read -- in a --.

Figure 1:
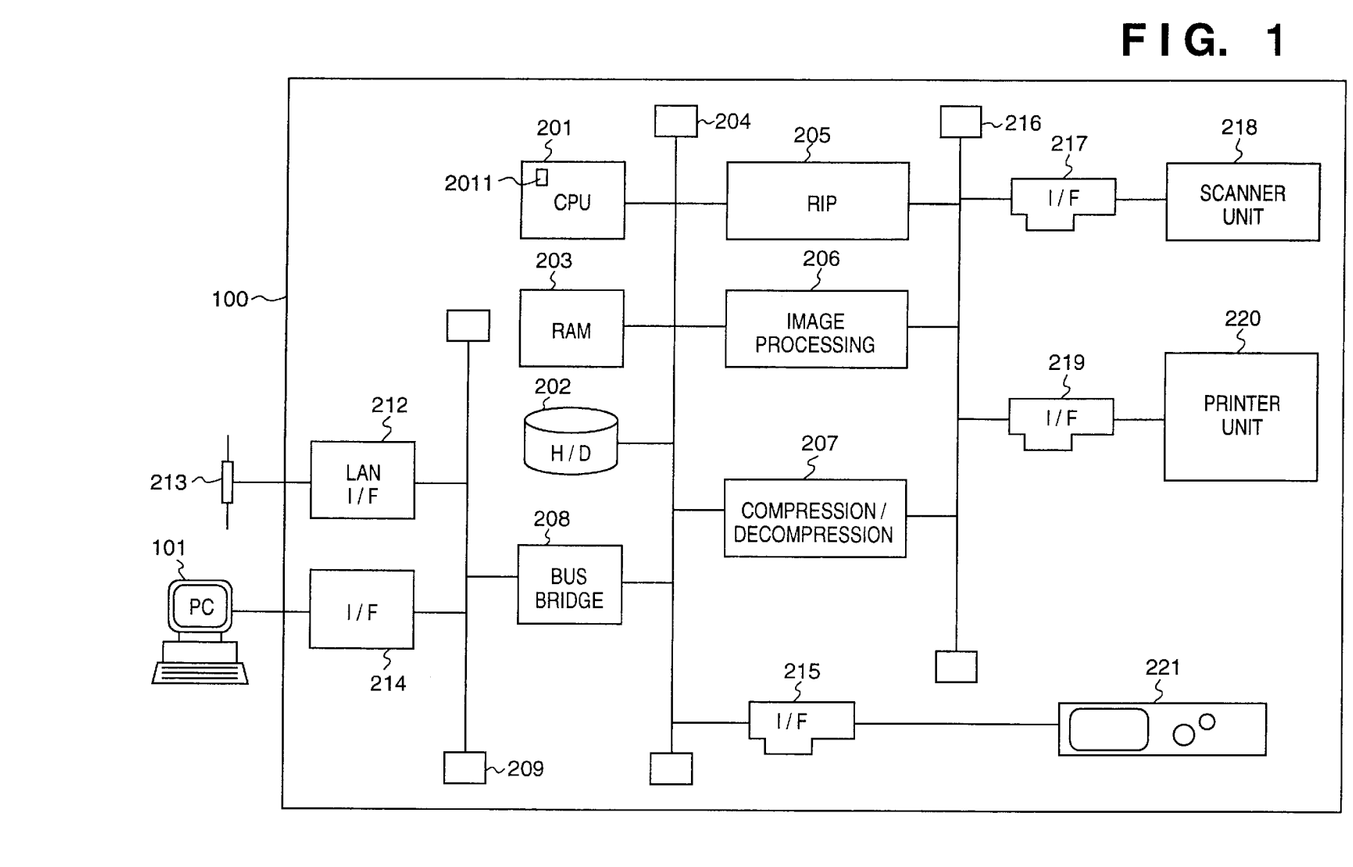
FIG. 1 is a block diagram illustrating the internal construction of a printer apparatus according to the present invention.

<u>Column 2,</u>
Line 15, "FIG. 1" should read -- FIG. 1. --.

<u>Column 7,</u>
Line 7, "are" should be deleted; and
Line 55, "function--of" should read -- function of --.

<u>Column 8,</u>
Line 44, "setting" should read -- settings --.

<u>Column 9,</u>
Line 31, "dependence" should read -- dependence on --.

<u>Column 10,</u>
Line 11, "rotation" should read -- rotations --.

<u>Column 15,</u>
Line 24, "includes" should read -- includes: --.

<u>Column 16,</u>
Line 14, "values;" should read -- values; and --.

Signed and Sealed this

Twelfth Day of March, 2002

Attest:

*Attesting Officer*

JAMES E. ROGAN
*Director of the United States Patent and Trademark Office*